US011507963B2

(12) United States Patent
Chen

(10) Patent No.: US 11,507,963 B2
(45) Date of Patent: Nov. 22, 2022

(54) METHOD AND DEVICE OF ANALYSIS BASED ON MODEL, AND COMPUTER READABLE STORAGE MEDIUM

(71) Applicant: PING AN TECHNOLOGY (SHENZHEN) CO., LTD., Shenzhen (CN)

(72) Inventor: Yiyun Chen, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 1101 days.

(21) Appl. No.: 16/084,242

(22) PCT Filed: Aug. 31, 2017

(86) PCT No.: PCT/CN2017/100042
§ 371 (c)(1),
(2) Date: Sep. 12, 2018

(87) PCT Pub. No.: WO2018/201646
PCT Pub. Date: Nov. 8, 2018

(65) Prior Publication Data
US 2021/0117989 A1    Apr. 22, 2021

(30) Foreign Application Priority Data

May 5, 2017   (CN) .......................... 201710311997.6

(51) Int. Cl.
*G06Q 30/02*   (2012.01)
*G06N 20/00*   (2019.01)
(Continued)

(52) U.S. Cl.
CPC ......... *G06Q 30/0201* (2013.01); *G06F 30/10* (2020.01); *G06N 20/00* (2019.01);
(Continued)

(58) Field of Classification Search
CPC .......... G06N 20/20; G06N 20/00; G06N 3/08; G06N 3/0481; G06N 3/0454;
(Continued)

(56) References Cited

U.S. PATENT DOCUMENTS 7,496,549 B2    2/2009  Selvaraj
7,958,063 B2 *  6/2011  Long ................... G06K 9/6269
                                                706/12
(Continued)

FOREIGN PATENT DOCUMENTS

CA    2712849 A1 *  2/2011 ............. G06Q 40/08
CN    103748995 B    1/2011
(Continued)

OTHER PUBLICATIONS

Lu Yu, Combination Forecasting Model of Customer Churns in Telecom Industry, Journal of Huaqiao University (Natural Science), vol. 37 No. 5, Sep. 30, 2016, pp. 637-640.
(Continued)

*Primary Examiner* — Rehana Perveen
*Assistant Examiner* — Troy A Maust

(57) ABSTRACT

The disclosure discloses a method and device of analysis based on a model, and a computer readable storage medium. The method includes: training various pre-determined models based on a preset number of customer information samples; combining the various trained models into a compound model according to a pre-determined combining rule, and after customer information to be analyzed is received, inputting the customer information to be analyzed into the compound model to output an analysis result. According to the disclosure, by the use of the compound model combined by the various models for analysis and prediction, the advantages of different models can be combined. Compared
(Continued)

with a single model for prediction, the compound model effectively improves the accuracy of a prediction result.

13 Claims, 4 Drawing Sheets

(51) Int. Cl.
    *G06F 30/10*     (2020.01)
    *G06Q 10/10*     (2012.01)
    *G06Q 40/02*     (2012.01)
    *G06Q 40/08*     (2012.01)

(52) U.S. Cl.
    CPC ........... *G06Q 10/10* (2013.01); *G06Q 40/025* (2013.01); *G06Q 40/08* (2013.01)

(58) Field of Classification Search
    CPC .. G06Q 30/0201; G06Q 10/10; G06Q 40/025; G06Q 40/08; G06Q 10/04; G06F 30/10
    See application file for complete search history.

(56) References Cited

U.S. PATENT DOCUMENTS

| | | | | |
|---|---|---|---|---|
| 8,719,073 | B1* | 5/2014 | Kirshenbaum | G06Q 30/016 705/7.32 |
| 9,070,046 | B2 | 6/2015 | Geng et al. | |
| 10,671,932 | B1* | 6/2020 | Chen | G06N 5/04 |
| 2008/0195650 | A1* | 8/2008 | Lingenfelder | G06N 20/00 707/999.102 |
| 2015/0032598 | A1* | 1/2015 | Fleming | G06Q 40/025 705/38 |
| 2015/0356461 | A1* | 12/2015 | Vinyals | G06N 7/00 706/12 |
| 2016/0048766 | A1* | 2/2016 | McMahon | G06N 20/20 706/12 |
| 2016/0203405 | A1 | 7/2016 | Laxmanan et al. | |
| 2017/0061330 | A1 | 3/2017 | Kurata | |

FOREIGN PATENT DOCUMENTS

| | | | | |
|---|---|---|---|---|
| CN | 102184453 | A | 9/2011 | |
| CN | 102270309 | A | 12/2011 | |
| CN | 102508907 | A | 6/2012 | |
| CN | 102663513 | A | 9/2012 | |
| CN | 103679287 | A | 3/2014 | |
| CN | 105719002 | A | 6/2016 | |
| CN | 105894138 | A | 8/2016 | |
| CN | 106157132 | A | 11/2016 | |
| CN | 106355140 | A | 1/2017 | |
| CN | 106548210 | A | 3/2017 | |
| EP | 2953066 | A2 * | 12/2015 | ............. G06N 20/00 |
| JP | 2016091306 | A | 5/2016 | |
| WO | 2016025608 | A1 | 2/2016 | |

OTHER PUBLICATIONS

Naiqian Ding et al., Review of the Combination Prediction for Wind Power, Advances in Meteorological Science and Technology, DOI: 10.3969/j.issn.2095-1973.2016.06.004, Dec. 31, 2016, p. 26-29.
Koen W. De Bock et al., An empirical evaluation of rotation-based ensemble classifiers for customer churn prediction, Expert Systems with Applications, Apr. 9, 2011, pp. 12293-12301, vol. 38, No. 10.
Hung-Yi Lo et al., An Ensemble of Three Classifiers for KDD Cup 2009: Expanded Linear Model, Heterogeneous Boosting, and Selective Naive Bayes, KDD cup 2009, JMLR: Workshop and Conference Proceedings 7, Jun. 28, 2009, pp. 57-64.
Search Report of counterpart European Patent Application No. 17899229.3 dated Apr. 15, 2020.
Examination Report of Australian Patent Application No. 2017408798 dated Jan. 31, 2020.

* cited by examiner

METHOD AND DEVICE OF ANALYSIS BASED ON MODEL, AND COMPUTER READABLE STORAGE MEDIUM

CROSS REFERENCE TO RELATED APPLICATIONS

This application is the national phase entry of International Application No. PCT/CN2017/100042, filed on Aug. 31, 2017, which is based upon and claims priority to Chinese Patent Application No. 2017103119976, filed on, the entire contents of which are incorporated herein by reference.

TECHNICAL FIELD

This disclosure relates to the technical field of computers, and more particularly relates to a method and device of analysis based on a model, and a computer readable storage medium.

BACKGROUND

At the present, in data mining prediction projects in the fields such as finance and insurance, the industry generally adopts a single model to predict a specific target event (for example, an insurance claim), but it is well known that different types of models have different explanation angles and emphasizing points on the target event, so that the accuracy of a prediction result obtained by the single model has a great boundedness, and the prediction error rate is relatively high.

SUMMARY

The disclosure mainly aims at providing a method and device of analysis based on a model, and a computer readable storage medium, and is designed to improve the accuracy of a prediction result.

To achieve the above-mentioned objective, a method of analysis based on a model is provided according to a first aspect of the disclosure, the method including:

A. training various pre-determined models based on a preset number of client information samples;

B. combining the various trained models into a compound model according to a pre-determined combination rule, and after client information to be analyzed is received, inputting the client information to be analyzed into the compound model to output an analysis result.

Further, to achieve the above-mentioned objective, a device of analysis based on a model is provided according to a second aspect of the disclosure, the device including processing equipment and storage equipment. The storage equipment stores a model analysis program which is executed by the processing equipment to implement the following steps:

A. training various pre-determined models based on a preset number of client information samples;

B. combining the various trained models into a compound model according to a pre-determined combination rule, and after client information to be analyzed is received, inputting the client information to be analyzed into the compound model to output an analysis result.

A computer readable storage medium is provided according to a third aspect of the disclosure, which stores at least one computer readable instruction executed by processing equipment to realize the following operation:

A. training various pre-determined models based on a preset number of client information samples;

B. combining the various trained models into a compound model according to a pre-determined combination rule, and after client information to be analyzed is received, inputting the client information to be analyzed into the compound model to output an analysis result.

According to the method and device of analysis based on the model, and the computer readable storage medium, which are provided by the disclosure, various pre-determined models are trained on the basis of the preset number of client information samples, the various trained models are combined into the compound model, and after the client information to be analyzed is received, the combined compound model is used for analyzing the client information to be analyzed. By the use of the compound model combined by the various models for analysis and prediction, the advantages of different models can be combined. Compared with a single model for prediction, this compound model effectively improves the accuracy of a prediction result.

Achieving of objectives, functional features, and advantages of this disclosure will be further described below in connection with the accompanying drawings.

DETAILED DESCRIPTION

For the purpose of making technical problems to be solved, technical solutions and beneficial effects of the disclosure clearer and more understandable, a further detailed description will be made below to the disclosure in combination with accompanying drawings and embodiments. It should be understood that the specific embodiments described herein are merely explanatory of the disclosure, but not intended to limit the disclosure.

A method of analysis based on a model is provided.

Figure 1:
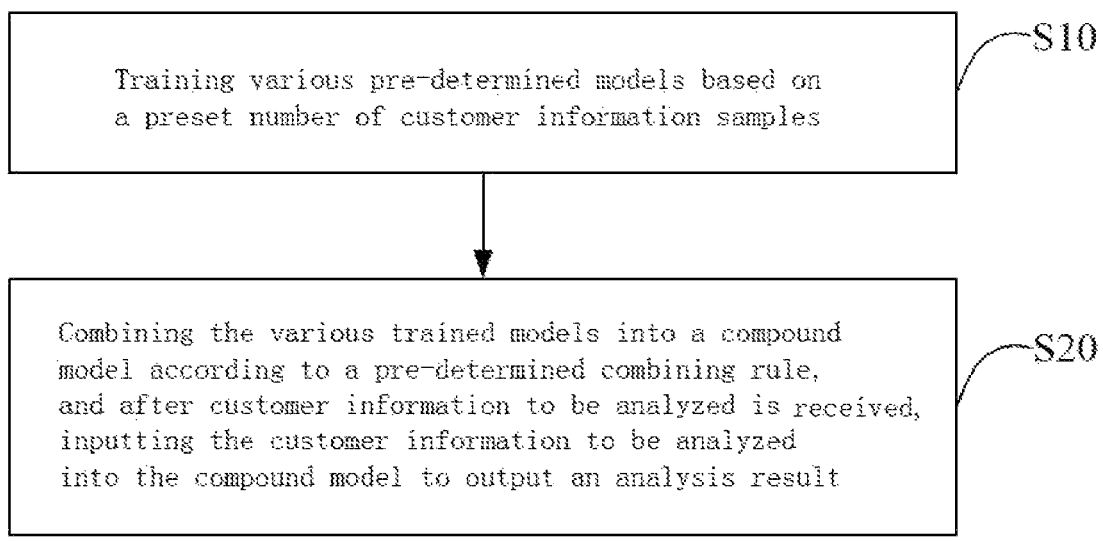
FIG. 1 is a flowchart of an embodiment of a method of analysis based on a model of the disclosure.

With reference to FIG. 1, it is a flowchart of an embodiment of a method of analysis based on a model of the disclosure.

In one embodiment, the method of analysis based on the model includes:

Step S10, various pre-determined models are trained on the basis a preset number of client information samples.

In this embodiment, the various pre-determined models are trained on the basis of the preset number (for example, 100,000) of client information samples. For example, client information in one client information sample includes, but not limited to, the sex, the age, a contact way, a home address, a work unit, a credit record, holding insurance product information, an insurance behavior habit, historical claim information, etc.; the holding insurance product information includes, but not limited to, a protection-oriented insurance product, an income type insurance product, a short-term type insurance product, a whole-life type insurance product, etc.; and the insurance behavior habit is that if a client holds a product, in insurance products held within a period of time (for example, in the recent 1 year or 3 years), for the longest time, or holds a product having the largest proportion, it indicates that the insurance behavior habit of this client is this product. For example, if a product, exceeding a preset ratio (for example, 60 percent), in insurance products held by one client is a protection-oriented product, it indicates that the insurance behavior habit of this client is preference to protection-oriented insurance products.

The pre-determined models to be trained include, but not limited to, a decision tree model, a linear regression model, a logistic regression model, a neural networks (NN) model, etc., wherein the decision tree model is a simple, but widely used, classifier, and a decision tree is built on the basis of training data, so that unknown data may be classified efficiently. With high readability and descriptiveness, the decision tree model contributes to artificial analysis, and the efficiency is high. The linear regression model may be a unary linear regression model or a multiple linear regression model. Unary linear regression is a main influence factor which serves as an independent variable for explaining changes of a dependent variable, but in a real problem research, the changes of the dependent variable are generally affected by several important factors, so that at the moment, it needs two or more influence factors serving as independent variables for explaining the changes of the dependent variable, and this is multiple regression or multi-regression. When multiple independent variables are in linear relation with dependent variables, the executed regression analysis is the multiple regression. The logistic regression model is a machine learning model commonly used in the current industry, and it is used for estimating the probability of a certain object. For example, in this embodiment, it is used for predicting the probability that a client covers insurance or the probability of an insurance type. The neural networks model is a complicated network system formed by widely and mutually connecting a large number of simple processing units (which are called neurons), and by reflecting many basic features of the human brain function, it is an extremely complicated nonlinear dynamic learning system. A neural network has large-scale paralleling, distributed storage and processing, self-organizing, adaptive and self-learning capabilities, and is particularly suitable for inaccurate and fuzzy information processing in need of considering many factors and conditions at the same time. For example, after being trained, the neural networks model may be used for predicting the probability that the client covers insurance or the probability of the insurance type, etc.

Step S20, the various trained models are combined into a compound model according to a pre-determined combination rule, and after being received, client information to be analyzed is input into the compound model to output an analysis result.

The various pre-determined models, such as the decision tree model, the linear regression model, the logistic regression model and the neural networks models, which are trained on the basis of the preset number of client information samples, are combined into the compound model according to the pre-determined combination rule. For example, corresponding weights are set for the different models according to the features and the advantages of the different modes and in combination with the features of the client information to be analyzed. If a dependent variable and a target variable are only in a simple linear relation, the weight of the linear regression model may be increased during combination of the compound model to improve the prediction speed and efficiency; and if there are many dependent variables, and complicated analysis is needed, the weight of the neural networks model may be increased during combination of the compound model to improve the prediction accuracy. After the various trained models are combined into the compound model according to the pre-determined combination rule, the client information to be analyzed may be input into the compound model on receipt of the client information to be analyzed to analyze and predict the client information to be analyzed by integrating the advantages of the various models, such as the decision tree model, the linear regression model, the logistic regression model and the neural networks model, and from different judgment angles, thus outputting more accurate analysis and prediction results.

In this embodiment, the various pre-determined models are trained on the basis of the preset number of client information samples, the various trained models are combined into the compound model, and after the client information to be analyzed is received, the combined compound model is used for analyzing the client information to be analyzed. By combination of the various models, the combined compound model used for analysis and prediction may integrate the advantages of the different models. Compared with a single model for prediction, the compound model effectively improves the accuracy of a prediction result.

Further, in other embodiments, the number of the pre-determined models is N which is a natural number more than 2. The $i^{th}$ pre-determined model is marked as Fi, and i is a positive integer less than or equal to N. The compound model combined by the various trained models according to the pre-determined combination rule is as follows:

the compound model=$(1/N)*F1+(1/N)*F2+ \ldots +(1/N)*FN$.

In this embodiment, during combination of the various trained models, the various models are averaged to combine the compound model, so that influences of all the models may be taken into balanced consideration to balance prediction results of all the models; and under a condition that the prediction results of all the models are little different, the most reasonable prediction result is obtained.

Further, in other embodiments, the number of the pre-determined models is N which is a natural number more than 2. The $i^{th}$ pre-determined model is marked as Fi, and i is a positive integer less than or equal to N. The compound model combined by the various trained models according to the pre-determined combination rule is as follows:

the compound model=$POWER(F1,1/N)*POWER(F2,1/N)* \ldots *POWER(FN,1/N)$, wherein POWER (Fi, 1/N) is to perform $N^{th}$ power root calculation on a result analyzed by the model Fi.

In this embodiment, during combination of the various trained models, results analyzed by all the models are subjected to the $N^{th}$ power root calculation, and then the models are combined to form the compound model. As the prediction result of each model has great influence on the prediction result of the finally combined model, the effect of each model in the combined model is highlighted, and the analysis and prediction effects of each model in the combined model may be exerted to the maximum extent. The prediction result of the finally combined model is decided on the basis of analysis results of all aspects, so that the accuracy of prediction is improved.

Further, in other embodiments, the number of the pre-determined models is N which is a natural number more than 2. The $i^{th}$ pre-determined model is marked as Fi, and i is a positive integer less than or equal to N. The compound model combined by the various trained models according to the pre-determined combination rule is as follows:

the compound model=$N/(1/F1+1/F2+ \ldots +1/FN)$.

In this embodiment, during combination of the various trained models, the compound model=$N/(1/F1+1/F2+ \ldots +1/FN)$, namely the compound model=$NF1F2^* \ldots FN/(F2F3^* \ldots FN+F1F3^* \ldots FN+ \ldots F1F2^* \ldots F(N-1))$, on the basis of considering the influence of the prediction result of each model on the prediction result of the finally combined model, overall consideration is also taken to the influence of the prediction results of the multiple models subjected to different combinations on the prediction result of the finally combined model, so that the most reasonable prediction result is obtained, and the accuracy of prediction is further improved.

Further, in one specific implementation mode, the three models, namely the logistic regression model, the decision tree model and the neural networks model, are combined to form the combined model, and the representation of the prediction accuracy of the combined model on a validation set is analyzed. There are six combination methods as follows for the logistic regression model, the decision tree model and the neural networks model: combination I: an equal weight method (for example, the compound model= $(1/N)^*F1+(1/N)^*F2+ \ldots +(1/N)^*FN$) in the above-mentioned embodiment; combination II: a three-model probability weighted average method; combination III: a weighted geometric combination average model; combination IV: a weighted harmonic geometric mean combination model (for example, the compound model=POWER (F1, 1/N) *POWER (F2, 1/N)* . . . *POWER (FN, 1/N) in this embodiment); combination V: a prediction error square and reciprocal method; and combination VI: a simple weighted average method. As shown in Table 1 below, upgrade degrees predicted by the logistic regression model and the models obtained by the combinations 1 to 6 on the verification set are listed in Table 1. Depths 1 to 99 in Table 1 respectively represent samples which have scores of 1 to 99 percent in the prediction results corresponding to the logistic regression model and the models obtained by the combinations 1 to 6 on the verification set; experimental data in Table 1 show that when the depth is 1, the mean performance of the combined model is upgraded by 4.5 percent when compared with that of the logistic regression; when the depth is 5, the mean performance of the combined model is upgraded by 5.3 percent when compared with that of the logistic regression; and when the depth is 10, the mean performance of the combined model is upgraded by 1.9 percent when compared with that of the logistic regression. In conclusion, by combining the logistic regression model, the decision tree model and the neural networks model, the prediction effect of the combined model is better than that of the single logistic regression model, namely compared with the single model for prediction, the combined model effectively improves the accuracy of the prediction result.

TABLE 1

| Depth | Combination 1 | Combination 2 | Combination 3 | Combination 4 | Combination 5 | Combination 6 | Logistic regression |
|---|---|---|---|---|---|---|---|
| 1 | 5.62 | 5.61 | 5.65 | 5.63 | 5.62 | 5.55 | 5.37 |
| 5 | 4.148 | 4.142 | 4.126 | 4.078 | 4.148 | 4.104 | 3.916 |
| 10 | 3.41 | 3.409 | 3.414 | 3.411 | 3.409 | 3.43 | 3.349 |
| 15 | 3.003 | 3.002 | 2.997 | 2.987 | 3.002 | 2.997 | 2.953 |
| 20 | 2.697 | 2.7 | 2.702 | 2.686 | 2.697 | 2.69 | 2.642 |

TABLE 1-continued

| Depth | Combination 1 | Combination 2 | Combination 3 | Combination 4 | Combination 5 | Combination 6 | Logistic regression |
|---|---|---|---|---|---|---|---|
| 25 | 2.466 | 2.462 | 2.460 | 2.458 | 2.466 | 2.450 | 2.403 |
| 30 | 2.26 | 2.257 | 2.263 | 2.258 | 2.260 | 2.258 | 2.217 |
| 35 | 2.109 | 2.108 | 2.106 | 2.098 | 2.109 | 2.103 | 2.060 |
| 40 | 1.969 | 1.971 | 1.970 | 1.962 | 1.969 | 1.960 | 1.928 |
| 45 | 1.842 | 1.843 | 1.839 | 1.830 | 1.842 | 1.832 | 1.807 |
| 50 | 1.725 | 1.725 | 1.727 | 1.72 | 1.725 | 1.722 | 1.701 |
| 55 | 1.627 | 1.625 | 1.629 | 1.627 | 1.627 | 1.624 | 1.606 |
| 60 | 1.540 | 1.538 | 1.541 | 1.544 | 1.540 | 1.536 | 1.523 |
| 65 | 1.459 | 1.457 | 1.459 | 1.461 | 1.459 | 1.454 | 1.449 |
| 70 | 1.384 | 1.382 | 1.385 | 1.384 | 1.384 | 1.381 | 1.374 |
| 75 | 1.310 | 1.309 | 1.311 | 1.312 | 1.310 | 1.308 | 1.306 |
| 80 | 1.24 | 1.240 | 1.241 | 1.241 | 1.24 | 1.238 | 1.238 |
| 85 | 1.173 | 1.173 | 1.173 | 1.172 | 1.173 | 1.172 | 1.172 |
| 90 | 1.110 | 1.110 | 1.109 | 1.108 | 1.110 | 1.110 | 1.110 |
| 95 | 1.052 | 1.052 | 1.051 | 1.050 | 1.052 | 1.052 | 1.052 |
| 99 | 1.010 | 1.010 | 1.009 | 1.008 | 1.010 | 1.010 | 1.010 |

Figure 2:
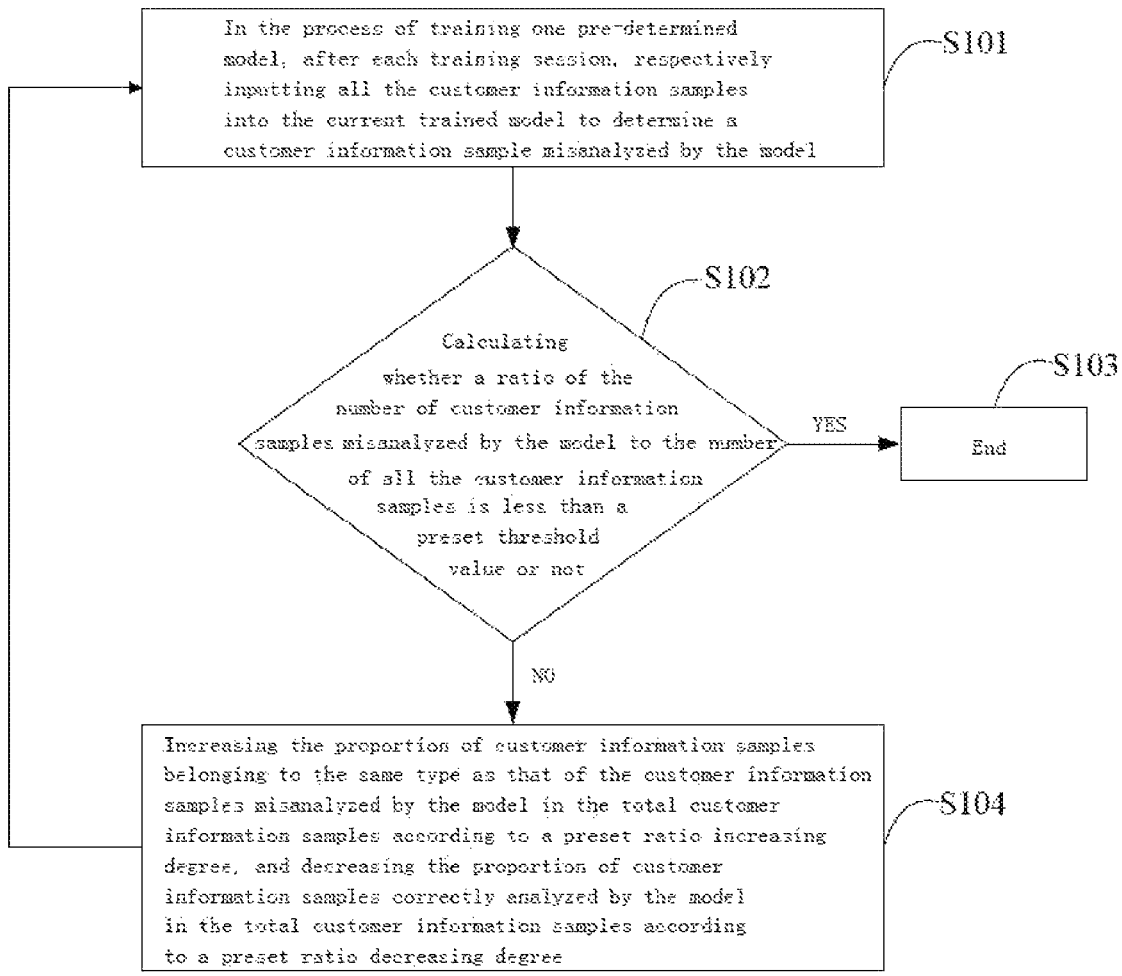
FIG. 2 is a flowchart of refinement of a step S10 in FIG. 1.

Further, as shown in FIG. 2, the above-mentioned step S10 may include:

Step S101, wherein in the process of training one pre-determined model, after each training session, all the client information samples are respectively input into the current trained model to determine a client information sample misanalyzed by the model;

Step 102, wherein whether a ratio of the number of client information samples misanalyzed by the model to the number of all the client information samples is less than a preset threshold value or not is calculated;

Step 103, wherein if the ratio of the number of client information samples misanalyzed by the model to the number of all the client information samples is less than the preset threshold value, the training of the pre-determined model is ended;

Step S104, wherein if the ratio of the number of client information samples misanalyzed by the model to the number of all the client information samples is greater than or equal to the preset threshold value, the proportion of client information samples belonging to the same type as that of the client information samples misanalyzed by the model is increased in the total client information samples according to a preset ratio increasing degree, the proportion of client information samples correctly analyzed by the model is decreased in the total client information samples according to a preset ratio decreasing degree, and then the step S101 is reexecuted.

In this embodiment, in the process of training the various pre-determined models based on the preset number of client information samples, during training of one pre-determined model, after each training session, the accuracy of the current model is analyzed and judged, for example, all the client information samples may be respectively input into the current trained model for analysis and prediction; if the ratio of the number of client information samples misanalyzed by the model to the number of all the client information samples is less than the preset threshold value (for example, 5 percent), it indicates that the accuracy of the current model is relatively high, the training is ended, and the current model is used as a trained model. If the ratio of the number of client information samples misanalyzed by the model to the number of all the client information samples is greater than or equal to the preset threshold value (for example, 5 percent), it indicates that the accuracy of the current model is relatively low, and then the proportion of client information samples belonging to the same type as that of the client information samples misanalyzed by the model is increased in the total client information samples according to the preset ratio increasing degree (for example, 1 percent), and the proportion (for example, if the client information samples correctly analyzed by the model account for 80 percent of the total client information samples, which would become 79 percent after being decreased) of client information samples correctly analyzed by the model is decreased in the total client information samples according to the preset ratio decreasing degree (for example, 1 percent); and on the basis of the adjusted client information samples, the model is continuously learnt and trained till its accuracy meets the requirement.

In the process of training one pre-determined model, after each training session, the accuracy of the current model is analyzed and judged, and the training is ended only if the accuracy of the model meets the requirement, thus guaranteeing high accuracy of each pre-determined model for combination. In addition, if the accuracy of the current model is judged to not meet the requirement, the proportion of client information samples belonging to the same type as that of the client information samples misanalyzed by the model is increased in the total client information samples to emphatically learn and train the model according to the type of the client information samples easily misanalyzed by the model, so that the pertinence is higher, and the model training efficiency and speed are improved.

For example, in one implementation mode, a specific description will be made by taking whether a client lodges a claim or not as an example: a general prediction model is that there is a business objective, which, for example, predicts whether the client lodges a claim or not within the next six months and predicts the probability of the claim. It is defined that a target variable is Y: namely whether the client lodges a claims or not; Y is a two-valued variable; if Y is equal to 1, the claim occurs; and if Y is equal to 0, no claim occurs. A prediction variable affects selection of data indexes of the target variable, including: the sex, the age, the holding insurance product information (such as the protection-oriented insurance product, the income type insurance product, the short-term type insurance product, the whole-life type insurance product, etc.), the insurance behavior habit (for example, if a product, exceeding a preset ratio, in insurance products held by one client is a protection-oriented product, it indicates that the insurance behavior habit of this client is preference to protection-oriented insurance products), historical claim information, etc.; the decision tree model may be built according to the prediction variable and the target variable of the client; once the decision tree model is built, if certain client information is provided, this decision tree model will provide the probability that each client lodges a claim; if a threshold value is set to be 0.5, when the decision tree model predicts that the probability that the client lodges a claim is more than 0.5, it indicates that the client will lodges a claim within the next six months; and when the decision tree model predicts that the probability that the client lodges a claim is less than 0.5, it indicates that the client will not lodge a claim within the next six months. The variable that the decision tree model predicts whether the client lodges a claim or not is set to be hat(Y), and hat(Y) is compared with the real claim situation Y of the client. If hat(Y) is equal to Y, it indicates that this sample is correctly learnt; and if hat(Y) is not equal to Y, it indicates that this sample is mis-learnt. Therefore, all mis-learnt client information samples may be determined, namely client information samples misanalyzed by the decision tree model.

A device of analysis based on a model is further provided.

Figure 3:
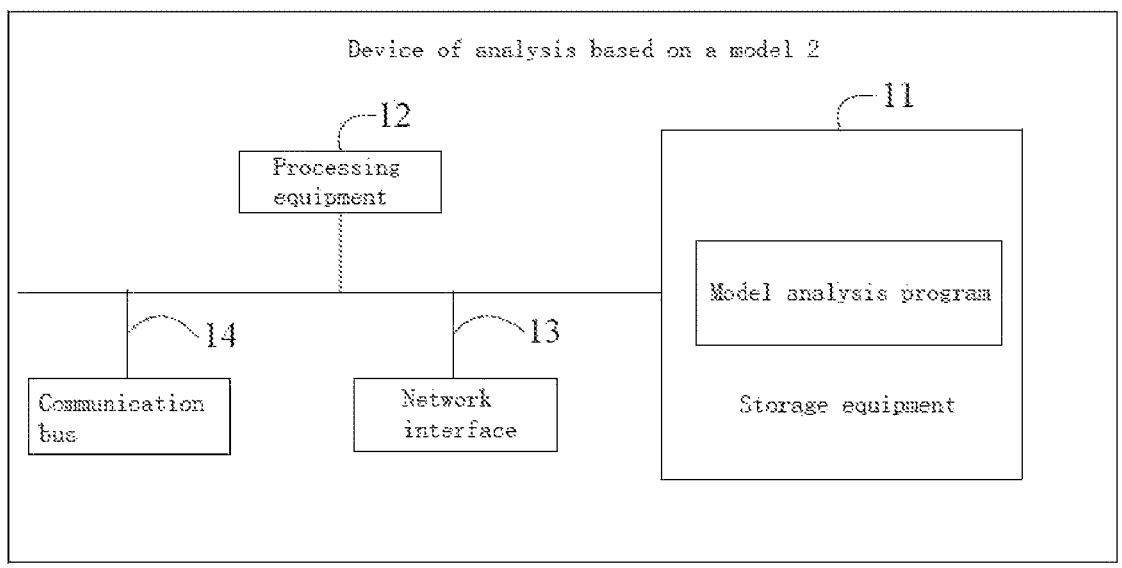
FIG. 3 is a schematic diagram of an embodiment of a device of analysis based on a model of the disclosure.

With reference to FIG. 3, it is a schematic diagram of an embodiment of a device of analysis based on a model of the disclosure.

In one embodiment, the device of analysis based on the model 2 may be a PC (Personal Computer), and also may be terminal equipment such as a smart phone, a flat computer, an e-book reader and a portable computer.

The device of analysis based on the model 2 includes storage equipment 11, processing equipment 12, a communication bus 13 and a network interface 14.

Wherein, the storage equipment 11 at least includes a readable storage medium of one type. The readable storage medium includes a flash memory, a hard disk, a multimedia card, a card memory (for example, an SD (Secure Digital) or DX memory), a magnetic memory, a magnetic disk, an optical disc, etc. In some embodiments, the storage equipment 11 may be an internal storage unit of a user keyword extraction device based on a social network, for example, a hard disk of the device of analysis based on the model. In some other embodiments, the storage equipment 11 also may be external storage equipment of the device of analysis based on the model, for example, a pluggable hard disk equipped on the device of analysis based on the model, an SMC (Smart Media Card), an SD card, a flash card, etc.; further, the storage equipment 11 also may include both the internal storage unit of the device of analysis based on the model and the external storage equipment. The storage equipment 11 may be used for not only storing application software installed in the device of analysis based on the model and all types of data, for example a model analysis code, and but also temporarily storing data which have been already output or are about to be output.

In some embodiments, the processing equipment 12 may be a CPU (Central Processing Unit), a controller, a micro controller, a micro processing unit or other data processing chips, and is used for executing a program code stored in the memory 11 or processing the data, for example, executing the model analysis program, etc.

The network interface 13 optionally includes a standard wired interface and a wireless interface (for example, a WI-FI interface), and is generally used for establishing communication connection between the device and other sets of electronic equipment.

The communication bus 14 is used for realizing connection and communication among these assemblies.

FIG. 3 only shows the device of analysis based on the model, which has the assemblies 11 to 14, but it should be understood that it does not require that all the shown assemblies are implemented, and to be substitutable, more or fewer assemblies are implemented.

Optionally, the device also may include a user interface. The user interface may include a display and an input unit such as a keyboard. Optionally, the user interface also may include a standard wired interface and a wireless interface. Optionally, in some embodiments, the display may be an LED display, a liquid crystal display, a touch liquid crystal display and an OLED (Organic Light-Emitting Diode) touch device, etc., wherein the display also may be properly called a display screen or a display unit, and is used for displaying information processed in the device of analysis based on the model and displaying a visual user interface.

In the device embodiment as shown in FIG. 3, the storage equipment 11 stores the model analysis program, and the processing equipment 12 executes the model analysis program stored in the storage equipment 11 to implement the following steps:

A. various pre-determined models are trained on the basis a preset number of client information samples;

in this embodiment, the various pre-determined models are trained on the basis of the preset number (for example, 100,000) of client information samples. For example, client information in one client information sample includes, but not limited to, the sex, the age, a contact way, a home address, a work unit, a credit record, holding insurance product information, an insurance behavior habit, historical claim information, etc.; the holding insurance product information includes, but not limited to, a protection-oriented insurance product, an income type insurance product, a short-term type insurance product, a whole-life type insurance product, etc.; and the insurance behavior habit is that if a client holds a product, in insurance products held within a period of time (for example, in the recent 1 year or 3 years), for the longest time, or holds a product having the largest proportion, it indicates that the insurance behavior habit of this client is this product. For example, if a product, exceeding a preset ratio (for example, 60 percent), in insurance products held by one client is a protection-oriented product, it indicates that the insurance behavior habit of this client is preference to protection-oriented insurance products.

The pre-determined models to be trained include, but not limited to, a decision tree model, a linear regression model, a logistic regression model, a neural networks (NN) model, etc., wherein the decision tree model is a simple, but widely used, classifier, and a decision tree is built on the basis of training data, so that unknown data may be classified efficiently. With high readability and descriptiveness, the decision tree model contributes to artificial analysis, and the efficiency is high. The linear regression model may be a unary linear regression model or a multiple linear regression model. Unary linear regression is a main influence factor which serves as an independent variable for explaining changes of a dependent variable, but in a real problem research, the changes of the dependent variable are generally affected by several important factors, so that at the moment, it needs two or more influence factors serving as independent variables for explaining the changes of the dependent variable, and this is multiple regression or multi-regression. When multiple independent variables are in linear relation with dependent variables, the executed regression analysis is the multiple regression. The logistic regression model is a machine learning model commonly used in the current industry, and it is used for estimating the probability of a certain object. For example, in this embodiment, it is used for predicting the probability that a client covers insurance or the probability of an insurance type. The neural networks model is a complicated network system formed by widely and mutually connecting a large number of simple processing units (which are called neurons), and by reflecting many basic features of the human brain function, it is an extremely complicated nonlinear dynamic learning system. A neural network has large-scale paralleling, distributed storage and processing, self-organizing, adaptive and self-learning capabilities, and is particularly suitable for inaccurate and fuzzy information processing in need of considering many factors and conditions at the same time. For example, after being trained, the neural networks model may be used for predicting the probability that the client covers insurance or the probability of the insurance type, etc.

B. the various trained models are combined into a compound model according to a pre-determined combination rule, and after being received, client information to be analyzed is input into the compound model to output an analysis result.

The various pre-determined models, such as the decision tree model, the linear regression model, the logistic regression model and the neural networks model, which are trained on the basis of the preset number of client information samples, are combined into the compound model according to the pre-determined combination rule. For example, corresponding weights are set for the different models according to the features and the advantages of the different modes and in combination with the features of the client information to be analyzed. If a dependent variable and a target variable are only in a simple linear relation, the weight of the linear regression model may be increased during combination of the compound model to improve the prediction speed and efficiency; and if there are many dependent variables, and complicated analysis is needed, the weight of the neural networks model may be increased during combination of the compound model to improve the prediction accuracy. After the various trained models are combined into the compound model according to the pre-determined combination rule, the client information to be analyzed may be input into the compound model on receipt of the client information to be analyzed to analyze and predict the client information to be analyzed by integrating the advantages of the various models, such as the decision tree model, the linear regression model, the logistic regression model and the neural networks model, and from different judgment angles, thus outputting more accurate analysis and prediction results.

In this embodiment, the various pre-determined models are trained on the basis of the preset number of client information samples, the various trained models are combined into the compound model, and after the client information to be analyzed is received, the combined compound model is used for analyzing the client information to be analyzed. By combination of the various models, the combined compound model used for analysis and prediction may integrate the advantages of the different models. Compared with a single model for prediction, the compound model effectively improves the accuracy of a prediction result.

Further, in other embodiments, the number of the pre-determined models is N which is a natural number more than 2. The $i^{th}$ pre-determined model is marked as Fi, and i is a positive integer less than or equal to N. The compound model combined by the various trained models according to the pre-determined combination rule is as follows:

the compound model=$(1/N)*F1+(1/N)*F2+ \ldots +(1/N)*FN$.

In this embodiment, during combination of the various trained models, the various models are averaged to combine the compound model, so that influences of all the models may be taken into balanced consideration to balance prediction results of all the models; and under a condition that the prediction results of all the models are little different, the most reasonable prediction result is obtained.

Further, in other embodiments, the number of the pre-determined models is N which is a natural number more than 2. The $i^{th}$ pre-determined model is marked as Fi, and i is a positive integer less than or equal to N. The compound model combined by the various trained models according to the pre-determined combination rule is as follows:

the compound model=$POWER(F1,1/N)*POWER(F2,1/N)* \ldots *POWER(FN,1/N)$, wherein POWER (Fi, 1/N) is to perform $N^{th}$ power root calculation on a result analyzed by the model Fi.

In this embodiment, during combination of the various trained models, results analyzed by all the models are subjected to the $N^{th}$ power root calculation, and then the models are combined to form the compound model. As the prediction result of each model has great influence on the prediction result of the finally combined model, the effect of each model in the combined model is highlighted, and the analysis and prediction effects of each model in the combined model may be exerted to the maximum extent. The prediction result of the finally combined model is decided on the basis of analysis results of all aspects, so that the accuracy of prediction is improved.

Further, in other embodiments, the number of the pre-determined models is N which is a natural number more than 2. The $i^{th}$ pre-determined model is marked as Fi, and i is a positive integer less than or equal to N. The compound model combined by the various trained models according to the pre-determined combination rule is as follows:

the compound model=$N/(1/F1+1/F2+ \ldots +1/FN)$.

In this embodiment, during combination of the various trained models, the compound model=$N/(1/F1+1/F2+ \ldots +1/FN)$, namely the compound model=$NF1F2* \ldots FN/(F2F3* \ldots FN+F1F3* \ldots FN+ \ldots F1F2* \ldots F(N-1))$, on the basis of considering the influence of the prediction result of each model on the prediction result of the finally combined model, overall consideration is also taken to the influence of the prediction results of the multiple models subjected to different combinations on the prediction result of the finally combined model, so that the most reasonable prediction result is obtained, and the accuracy of prediction is further improved.

Further, in one specific implementation mode, the three models, namely the logistic regression model, the decision tree model and the neural networks model, are combined to form the combined model, and the representation of the prediction accuracy of the combined model on a validation set is analyzed. There are six combination methods as follows for the logistic regression model, the decision tree model and the neural networks model: combination I: an equal weight method (for example, the compound model= $(1/N)*F1+(1/N)*F2+ \ldots +(1/N)*FN$ in the above-mentioned embodiment; combination II: a three-model probability weighted average method; combination III: a weighted geometric combination average model; combination IV: a weighted harmonic geometric mean combination model (for example, the compound model=POWER (F1, 1/N) *POWER (F2, 1/N)* . . . *POWER (FN, 1/N) in this embodiment); combination V: a prediction error square and reciprocal method; and combination VI: a simple weighted average method. As shown in Table 2 below, upgrade degrees predicted by the logistic regression model and the models obtained by the combinations 1 to 6 on the verification set are listed in Table 2. Depths 1 to 99 in Table 2 respectively represent samples which have scores of 1 to 99 percent in the prediction results corresponding to the logistic regression model and the models obtained by the combinations 1 to 6 on the verification set; experimental data in Table 2 show that when the depth is 1, the mean performance of the combined model is upgraded by 4.5 percent compared with that of the logistic regression; when the depth is 5, the mean performance of the combined model is upgraded by 5.3 percent compared with that of the logistic regression; and when the depth is 10, the mean performance of the combined model is upgraded by 1.9 percent compared with that of the logistic regression. In conclusion, by combining the logistic regression model, the decision tree model and the neural networks model, the prediction effect of the combined model is better than that of the single logistic regression model, namely compared with the single model for prediction, the combined model effectively improves the accuracy of the prediction result.

TABLE 2

| Depth | Combination 1 | Combination 2 | Combination 3 | Combination 4 | Combination 5 | Combination 6 | Logistic regression |
|---|---|---|---|---|---|---|---|
| 1 | 5.62 | 5.61 | 5.65 | 5.63 | 5.62 | 5.55 | 5.37 |
| 5 | 4.148 | 4.142 | 4.126 | 4.078 | 4.148 | 4.104 | 3.916 |
| 10 | 3.41 | 3.409 | 3.414 | 3.411 | 3.409 | 3.43 | 3.349 |
| 15 | 3.003 | 3.002 | 2.997 | 2.987 | 3.002 | 2.997 | 2.953 |
| 20 | 2.697 | 2.7 | 2.702 | 2.686 | 2.697 | 2.69 | 2.642 |
| 25 | 2.466 | 2.462 | 2.460 | 2.458 | 2.466 | 2.450 | 2.403 |
| 30 | 2.26 | 2.257 | 2.263 | 2.258 | 2.260 | 2.258 | 2.217 |
| 35 | 2.109 | 2.108 | 2.106 | 2.098 | 2.109 | 2.103 | 2.060 |
| 40 | 1.969 | 1.971 | 1.970 | 1.962 | 1.969 | 1.960 | 1.928 |
| 45 | 1.842 | 1.843 | 1.839 | 1.830 | 1.842 | 1.832 | 1.807 |
| 50 | 1.725 | 1.725 | 1.727 | 1.72 | 1.725 | 1.722 | 1.701 |
| 55 | 1.627 | 1.625 | 1.629 | 1.627 | 1.627 | 1.624 | 1.606 |
| 60 | 1.540 | 1.538 | 1.541 | 1.544 | 1.540 | 1.536 | 1.523 |
| 65 | 1.459 | 1.457 | 1.459 | 1.461 | 1.459 | 1.454 | 1.449 |
| 70 | 1.384 | 1.382 | 1.385 | 1.384 | 1.384 | 1.381 | 1.374 |
| 75 | 1.310 | 1.309 | 1.311 | 1.312 | 1.310 | 1.308 | 1.306 |
| 80 | 1.24 | 1.240 | 1.241 | 1.241 | 1.24 | 1.238 | 1.238 |
| 85 | 1.173 | 1.173 | 1.173 | 1.172 | 1.173 | 1.172 | 1.172 |
| 90 | 1.110 | 1.110 | 1.109 | 1.108 | 1.110 | 1.110 | 1.110 |
| 95 | 1.052 | 1.052 | 1.051 | 1.050 | 1.052 | 1.052 | 1.052 |
| 99 | 1.010 | 1.010 | 1.009 | 1.008 | 1.010 | 1.010 | 1.010 |

Further, in one embodiment, the above-mentioned step A also may include the following:

C. in the process of training one pre-determined model, after each training session, all the client information samples are respectively input into the current trained model to determine a client information sample misanalyzed by the model;

D. whether a ratio of the number of client information samples misanalyzed by the model to the number of all the client information samples is less than a preset threshold value or not is calculated;

E. if the ratio of the number of client information samples misanalyzed by the model to the number of all the client information samples is less than the preset threshold value, the training of the pre-determined model is ended;

F. if the ratio of the number of client information samples misanalyzed by the model to the number of all the client information samples is greater than or equal to the preset threshold value, the proportion of client information samples belonging to the same type as that of the client information samples misanalyzed by the model is increased in the total client information samples according to a preset ratio increasing degree, the proportion of client information samples correctly analyzed by the model is decreased in the total client information samples according to a preset ratio decreasing degree, and then the steps C, D, E and F are reexecuted.

In this embodiment, in the process of training the various pre-determined models based on the preset number of client information samples, during training of one pre-determined model, after each training session, the accuracy of the current model is analyzed and judged, for example, all the client information samples may be respectively input into the current trained model for analysis and prediction; if the ratio of the number of client information samples misanalyzed by the model to the number of all the client information samples is less than the preset threshold value (for example, 5 percent), it indicates that the accuracy of the current model is relatively high, the training is ended, and the current model is used as a trained model. If the ratio of the number of client information samples misanalyzed by the model to the number of all the client information samples is greater than or equal to the preset threshold value (for example, 5 percent), it indicates that the accuracy of the current model is relatively low, and then the proportion of client information samples belonging to the same type as that of the client information samples misanalyzed by the model is increased in the total client information samples according to the preset ratio increasing degree (for example, 1 percent), and the proportion (for example, if the client information samples correctly analyzed by the model account for 80 percent of the total client information samples, which would become 79 percent after being decreased) of client information samples correctly analyzed by the model is decreased in the total client information samples according to the preset ratio decreasing degree (for example, 1 percent); and on the basis of the adjusted client information samples, the model is continuously learnt and trained till its accuracy meets the requirement.

In the process of training one pre-determined model, after each training session, the accuracy of the current model is analyzed and judged, and the training is ended only if the accuracy of the model meets the requirement, thus guaranteeing high accuracy of each pre-determined model for combination. In addition, if the accuracy of the current model is judged to not meet the requirement, the proportion of client information samples belonging to the same type as that of the client information samples misanalyzed by the model is increased in the total client information samples to emphatically learn and train the model according to the type of the client information samples easily misanalyzed by the model, so that the pertinence is higher, and the model training efficiency and speed are improved.

For example, in one implementation mode, a specific description will be made by taking whether a client lodges a claim or not as an example: a general prediction model is that there is a business objective, which, for example, predicts whether the client lodges a claim or not within the next six months and predicts the probability of the claim. It is defined that a target variable is Y: namely whether the client lodges a claim or not; Y is a two-valued variable; if Y is equal to 1, the claim occurs; and if Y is equal to 0, no claim occurs. A prediction variable affects selection of data indexes of the target variable, including: the sex, the age, the holding insurance product information (such as the protection-oriented insurance product, the income type insurance product, the short-term type insurance product, the whole-life type insurance product, etc.), the insurance behavior habit (for example, if a product, exceeding a preset ratio, in insurance products held by one client is a protection-oriented product, it indicates that the insurance behavior habit of this client is preference to protection-oriented insurance products), historical claim information, etc.; the decision tree model may be built according to the prediction variable and the target variable of the client; once the decision tree model is built, if certain client information is provided, this decision tree model will provide the probability that each client lodges a claim; if a threshold value is set to be 0.5, when the decision tree model predicts that the probability that the client lodges a claim is more than 0.5, it indicates that the client will lodge a claim within the next six months; and when the decision tree model predicts that the probability that the client lodges a claim is less than 0.5, it indicates that the client will not lodge a claim within the next six months. The variable that the decision tree model predicts whether the client lodges a claim or not is set to be hat(Y), and hat(Y) is compared with the real claim situation Y of the client. If hat(Y) is equal to Y, it indicates that this sample is correctly learnt; and if hat(Y) is not equal to Y, it indicates that this sample is mis-learnt. Therefore, all mis-learnt client information samples may be determined, namely client information samples misanalyzed by the decision tree model.

Figure 4:
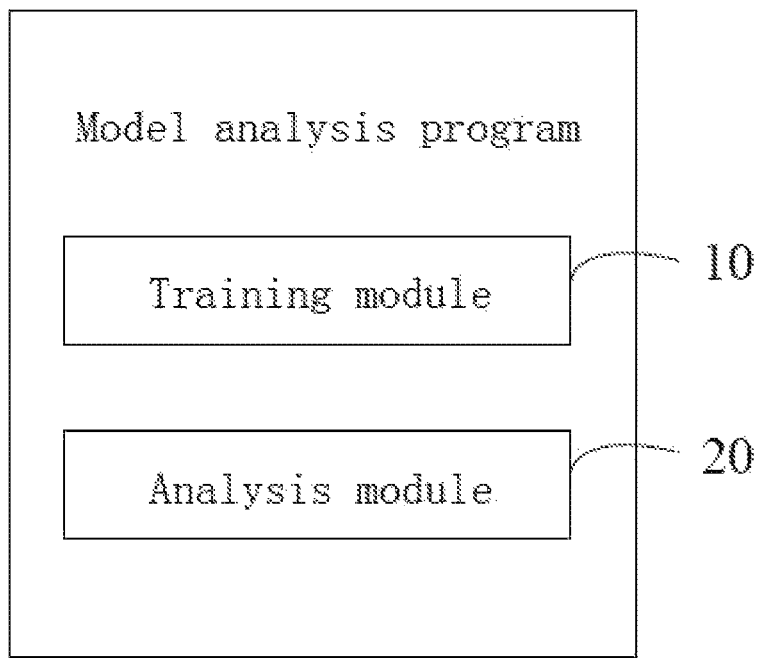
FIG. 4 is a schematic diagram of a functional module of a model analysis program in one embodiment of the device of analysis based on a model of the disclosure.

Optionally, in other embodiments, the model analysis program also may be partitioned into one or more modules. The one or more modules are stored in the memory 11, and are executed by one or more processing units (the processing unit 12 in this embodiment) so as to complete the disclosure. The modules described herein are a series of computer program instruction segments capable of completing specific functions. For example, as shown in FIG. 4, it is a schematic diagram of a functional module of a model analysis program in one embodiment of the device of analysis based on the model of the disclosure. In this embodiment, the model analysis program may be partitioned into a training module 10 and an analysis module 20, wherein functions or operation steps which are realized by the training module 10 and the analysis module 20 are all similar to those mentioned in the preceding text, so that no more details will be given here. For example:

the training module 10 is used for training various pre-determined models based on a preset number of client information samples;

the analysis module 20 is used for combining the various trained models into a compound model according to a pre-determined combination rule, and after client information to be analyzed is received, inputting the client information to be analyzed into the compound model to output an analysis result.

In addition, a computer readable storage medium is further provided according to the embodiment of the disclosure, which stores at least one computer readable storage instruction executed by processing equipment to implement the following operation:

A. training various pre-determined models based on a preset number of client information samples;

B. combining the various trained models into a compound model according to a pre-determined combination rule, and after client information to be analyzed is received, inputting the client information to be analyzed into the compound model to output an analysis result It should be noted that the specific implementation mode of the computer readable storage medium of the disclosure is basically the same as all the embodiments of the device and method of analysis based on the model, so that no more details will be given here.

It should be noted that in this text, terms "include" and "comprise" or any other variations aim at covering non-excludable including, so that processes, methods, objects or devices including a series of elements not only include those elements, but also include other elements which are not definitely listed, or also include fixed elements of these processes, methods, objects or devices. In the absence of more restrictions, an element defined by a sentence "including a/an . . . " does not exclude that the processes, methods, objects or devices including this element still include other same elements.

By the description of the foregoing implementation modes, it will be evident to those skilled in the art that the methods according to the above-mentioned embodiments may be implemented by means of software and a necessary general-purpose hardware platform; they may of course be implemented by hardware, but in many cases, the former will be more advantageous. Based on such an understanding, the essential technical solution of the disclosure, or the portion that contributes to the prior art may be embodied as software products. Computer software products can be stored in a storage medium (e.g., an ROM/RAM (Read Only Memory/Random Access Memory), a magnetic disk, an optical disc) and may include a plurality of instructions that can enable a set of terminal equipment(e.g., a mobile phone, a computer, a server, an air conditioner, network equipment) to execute the methods described in the various embodiments of the disclosure.

The foregoing accompanying drawings describe exemplary embodiments of the disclosure, and therefore are not intended as limiting the patentable scope of the disclosure. The foregoing numbering of the embodiments of the disclosure is merely descriptive, but is not indicative of the advantages and disadvantages of these embodiments. In addition, although a logic sequence is shown in the flowchart, the steps shown or described may be executed in a sequence different from this logic sequence in some cases.

Those skilled in the art can make various transformation solutions to implement the disclosure without departing from the scope and essence of the disclosure, for example, features of one embodiment may be used in another embodiment to obtain another embodiment. Any modifications, equivalent replacements and improvements that are made taking advantage of the technical conception of the disclosure shall all fall within the patentable scope of the disclosure.

What is claimed is:

1. A computer-implemented analysis method using at least one processor based on a model for predicting a target event in a data mining prediction project in finance or insurance, wherein the target event comprises an insurance claim, comprising:
   A. training a plurality of pre-determined models using a preset number of client information samples, wherein the plurality of pre-determined models comprises a decision tree model, a linear regression model, a logistic regression model, and a neural networks (NN) model, and wherein the plurality of pre-determined models are each trained using the same client information samples in the preset number; and
   B. combining the plurality of trained models into a compound model according to a pre-determined combination rule, and after a piece of client information to be analyzed is received, inputting the piece of client information to be analyzed into the compound model to output an analysis result;
   wherein the operation of training the plurality of pre-determined models using the preset number of client information samples comprises:
   C. in a process of training each pre-determined model using the same client information samples in the preset number, after each training session, separately inputting all of the preset number of client information samples into a current trained model to determine a client information sample misanalyzed by the current trained model;
   D. calculating whether a ratio of a number of the client information samples misanalyzed by the current trained model to the number of all the preset number of client information samples is less than a preset threshold value;
   E. in response to calculating that the ratio of the number of the client information samples misanalyzed by the current trained model to the number of all the preset number of client information samples is less than the preset threshold value, ending the training of the current trained model;
   F. in response to calculating that the ratio of the number of the client information samples misanalyzed by the current trained model to the number of all the preset number of client information samples is greater than or equal to the preset threshold value, increasing a proportion of client information samples belonging to a same type as that of the client information samples misanalyzed by the current trained model in the total preset number of client information samples according to a preset ratio increasing degree, and reducing a proportion of client information samples correctly analyzed by the model in the total preset number of client information samples according to a preset ratio decreasing degree, and then re-performing the above operations C, D, E and F.

2. The computer-implemented analysis method according to claim 1, wherein a number of the pre-determined models is N which is a natural number more than 2; an $i^{th}$ pre-determined model is marked as Fi, and i is a positive integer less than or equal to N; the compound model combined by the plurality of trained pre-determined models according to the pre-determined combination rule is as follows:

$$\text{the compound model} = (1/N)*F1 + (1/N)*F2 + \ldots + (1/N)*FN.$$

3. The computer-implemented analysis method according to claim 1, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

$$\text{the compound model} = POWER(F1, 1/N)*POWER(F2, 1/N)* \ldots *POWER(FN, 1/N),$$

wherein POWER (Fi, 1/N) is to perform $N^{th}$ power root calculation on a result analyzed by the model Fi.

4. The computer-implemented analysis method according to claim 1, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

$$\text{the compound model} = N/(1/F1 + 1/F2 + \ldots + 1/FN).$$

5. An analysis device based on a model, comprising a processor and a non-transitory computer-readable storage medium, wherein the non-transitory computer-readable storage medium stores a model analysis program which, when executed by the processor, causes the device to perform the following operations for predicting a target event in a data mining prediction project in finance or insurance, wherein the target event comprises an insurance claim:
   A. training a plurality of pre-determined models using a preset number of client information samples; wherein the plurality of pre-determined models comprises a decision tree model, a linear regression model, a logistic regression model, and a neural networks (NN) model, and wherein the plurality of pre-determined models are each trained using the same client information samples in the preset number; and
   B. combining the plurality of trained models into a compound model according to a pre-determined combination rule, and after a piece of client information to be analyzed is received, inputting the piece of client information to be analyzed into the compound model to output an analysis result;

wherein the operation of training the plurality of pre-determined models using the preset number of client information samples comprises:

C. in a process of training each pre-determined model using the same client information samples in the preset number, after each training session, separately inputting all of the preset number of client information samples into a current trained model to determine a client information sample misanalyzed by the current trained model;

D. calculating whether a ratio of a number of the client information samples misanalyzed by the current trained model to the number of all the preset number of client information samples is less than a preset threshold value;

E. in response to calculating that the ratio of the number of the client information samples misanalyzed by the current trained model to the number of all the preset number of client information samples is less than the preset threshold value, ending the training of the current trained model;

F. in response to calculating that the ratio of the number of the client information samples misanalyzed by the current trained model to the number of all the preset number of client information samples is greater than or equal to the preset threshold value, increasing a proportion of client information samples belonging to a same type as that of the client information samples misanalyzed by the current trained model in the total preset number of client information samples according to a preset ratio increasing degree, and reducing a proportion of client information samples correctly analyzed by the model in the total preset number of client information samples according to a preset ratio decreasing degree, and then re-performing the above operations C, D, E and F.

6. The analysis device according to claim 5, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

the compound model=$(1/N)*F1+(1/N)*F2+ \ldots +(1/N)*FN$.

7. The analysis device according to claim 5, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

the compound model=$POWER(F1,1/N)*POWER(F2,1/N)* \ldots *POWER(FN,1/N)$, wherein POWER (Fi, 1/N) is to perform $N^{th}$ power root calculation on a result analyzed by the model Fi.

8. A non-transitory computer readable storage medium, which stores at least one computer-readable instruction which when executed by a processor causes the following operations to be performed for predicting a target event in a data mining prediction project in finance or insurance, wherein the target event comprises an insurance claim:

A. training a plurality of pre-determined models using a preset number of client information samples, wherein the plurality of pre-determined models comprises a decision tree model, a linear regression model, a logistic regression model, and a neural networks (NN) model, and wherein the plurality of pre-determined models are each trained using the same client information samples in the preset number; and B. combining the plurality of trained models into a compound model according to a pre-determined combination rule, and after a piece of client information to be analyzed is received, inputting the piece of client information to be analyzed into the compound model to output an analysis result;

wherein the operation of training the plurality of pre-determined models using the preset number of client information samples comprises:

C. in a process of training each pre-determined model using the same client information samples in the preset number, after each training session, separately inputting all of the preset number of client information samples into a current trained model to determine a client information sample misanalyzed by the current trained model;

D. calculating whether a ratio of a number of the client information samples misanalyzed by the current trained model to the number of all the preset number of client information samples is less than a preset threshold value;

E. in response to calculating that the ratio of the number of the client information samples misanalyzed by the current trained model to the number of all the preset number of client information samples is less than the preset threshold value, ending the training of the current trained model;

F. in response to calculating that the ratio of the number of the client information samples misanalyzed by the current trained model to the number of all the preset number of client information samples is greater than or equal to the preset threshold value, increasing a proportion of client information samples belonging to a same type as that of the client information samples misanalyzed by the current trained model in the total preset number of client information samples according to a preset ratio increasing degree, and reducing a proportion of client information samples correctly analyzed by the model in the total preset number of client information samples according to a preset ratio decreasing degree, and then re-performing the above operations C, D, E and F.

9. The non-transitory computer readable storage medium according to claim 8, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

the compound model=$(1/N)*F1+(1/N)*F2+ \ldots +(1/N)*FN$.

10. The non-transitory computer readable storage medium according to claim 8, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

the compound model=POWER($F$1,1/$N$)*POWER($F$2, 1/$N$)* ... *POWER($FN$,1/$N$), wherein POWER (Fi, 1/N) is to perform $N^{th}$ power root calculation on a result analyzed by the model Fi.

11. The non-transitory computer readable storage medium according to claim 8, wherein a number of the pre-determined models is N which is a natural number more than 2; an $i^{th}$ pre-determined model is marked as Fi, and i is a positive integer less than or equal to N; the compound model combined by the plurality of trained models according to the pre-determined combination rule is as follows:

the compound model=$N$/(1/$F$1+1/$F$2+ ... +1/$FN$).

12. The computer-implemented analysis method according to claim 1, wherein client information contained in each client information sample comprises sex, age, contact method, home address, work place, credit record, held insurance product information, insurance behavior habit, and historical claim information; wherein the held insurance product information comprises a protection-oriented insurance product, an income type insurance product, a short-term type insurance product, and a whole-life type insurance product; wherein the insurance behavior habit comprises all the insurance products held by a client within a predetermined period of time, the insurance product that is held for the longest time, and the insurance product that has the largest time or has the largest proportion during the predetermined period of time.

13. The computer-implemented analysis method according to claim 12, wherein predicting the target event comprises predicting whether a client lodges a claim or not within a predetermined period of time in the future.

* * * * *